F. L. JEFFERIES & W. SPAIN.
CAN FILLING APPARATUS.
APPLICATION FILED FEB. 23, 1911.

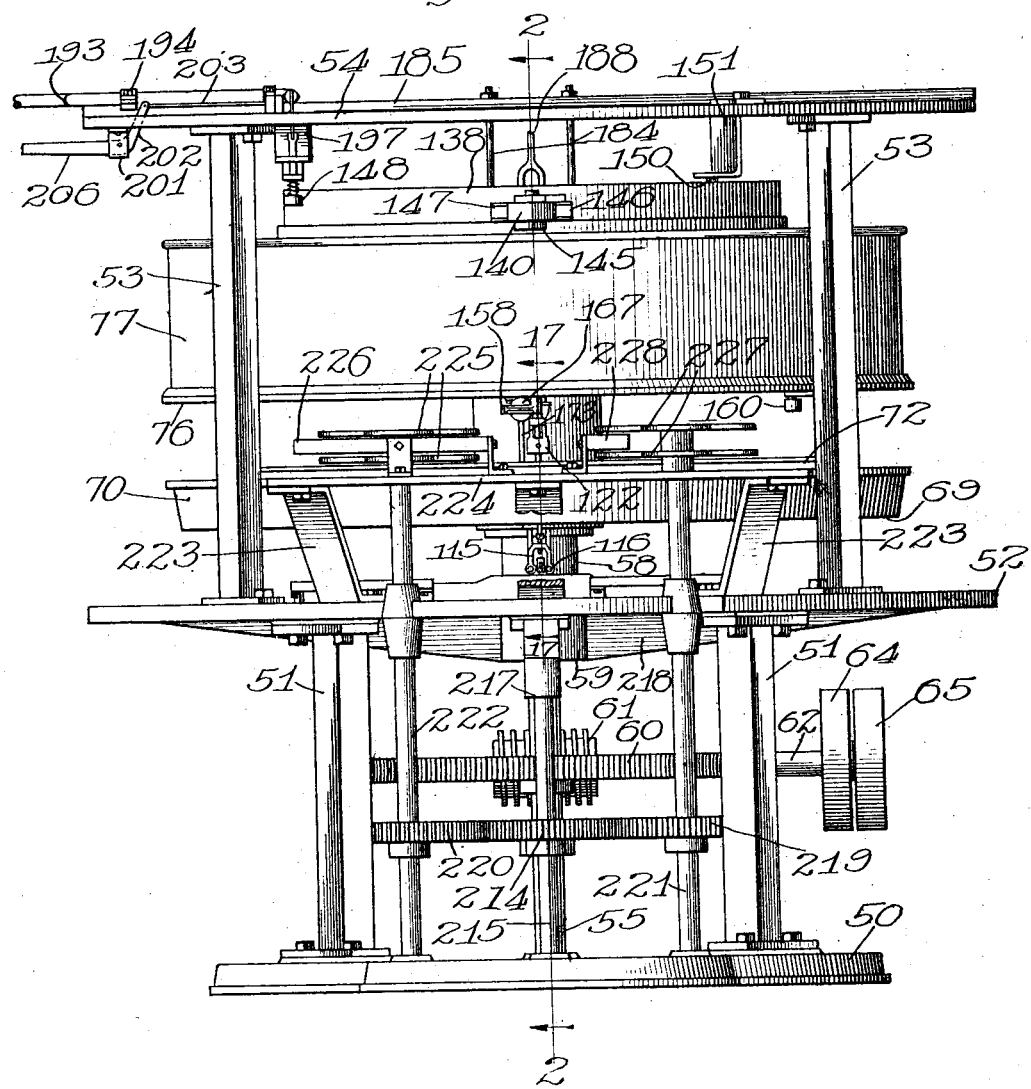

1,079,495.

Patented Nov. 25, 1913.
13 SHEETS—SHEET 2.

F. L. JEFFERIES & W. SPAIN.
CAN FILLING APPARATUS.
APPLICATION FILED FEB. 23, 1911.
1,079,495.
Patented Nov. 25, 1913.
13 SHEETS—SHEET 3.
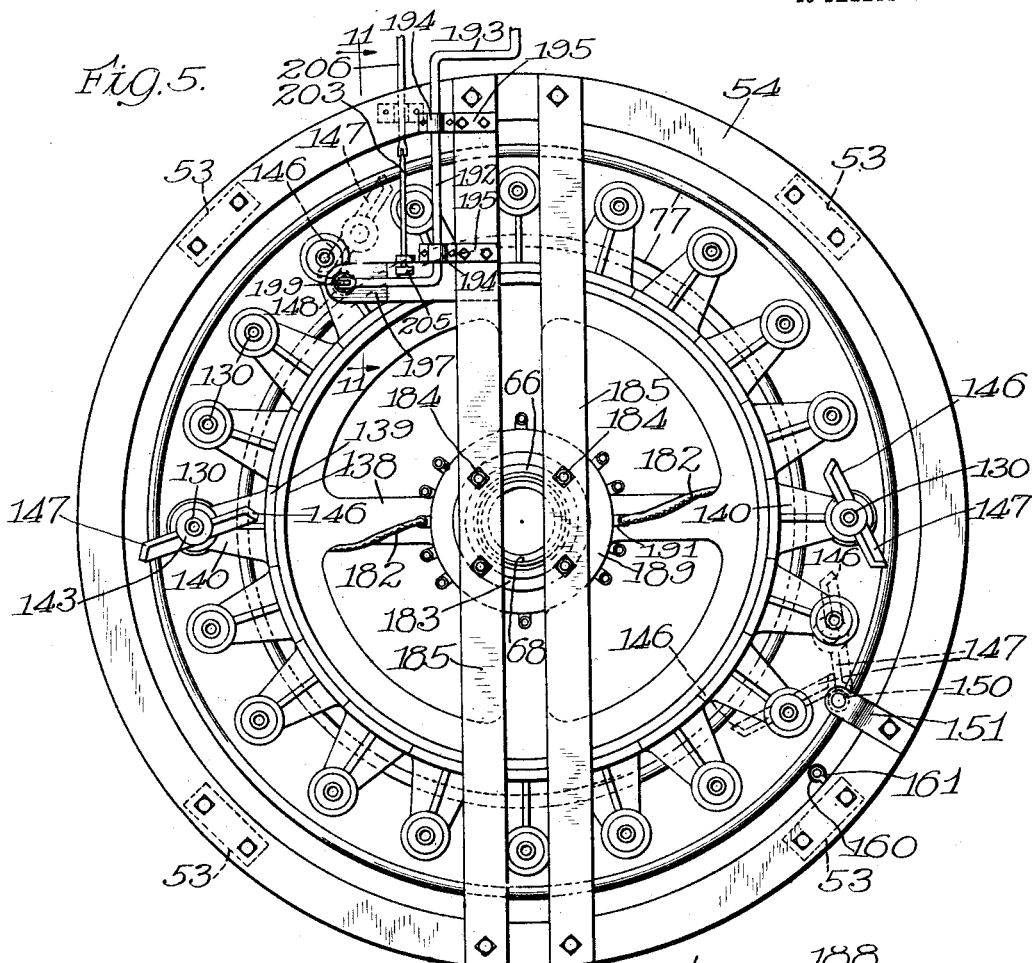
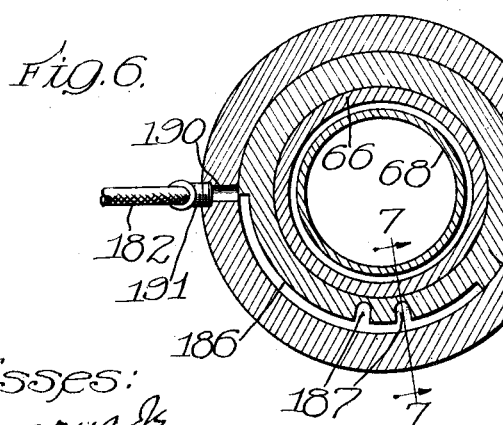
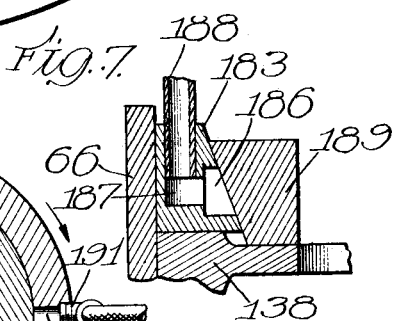

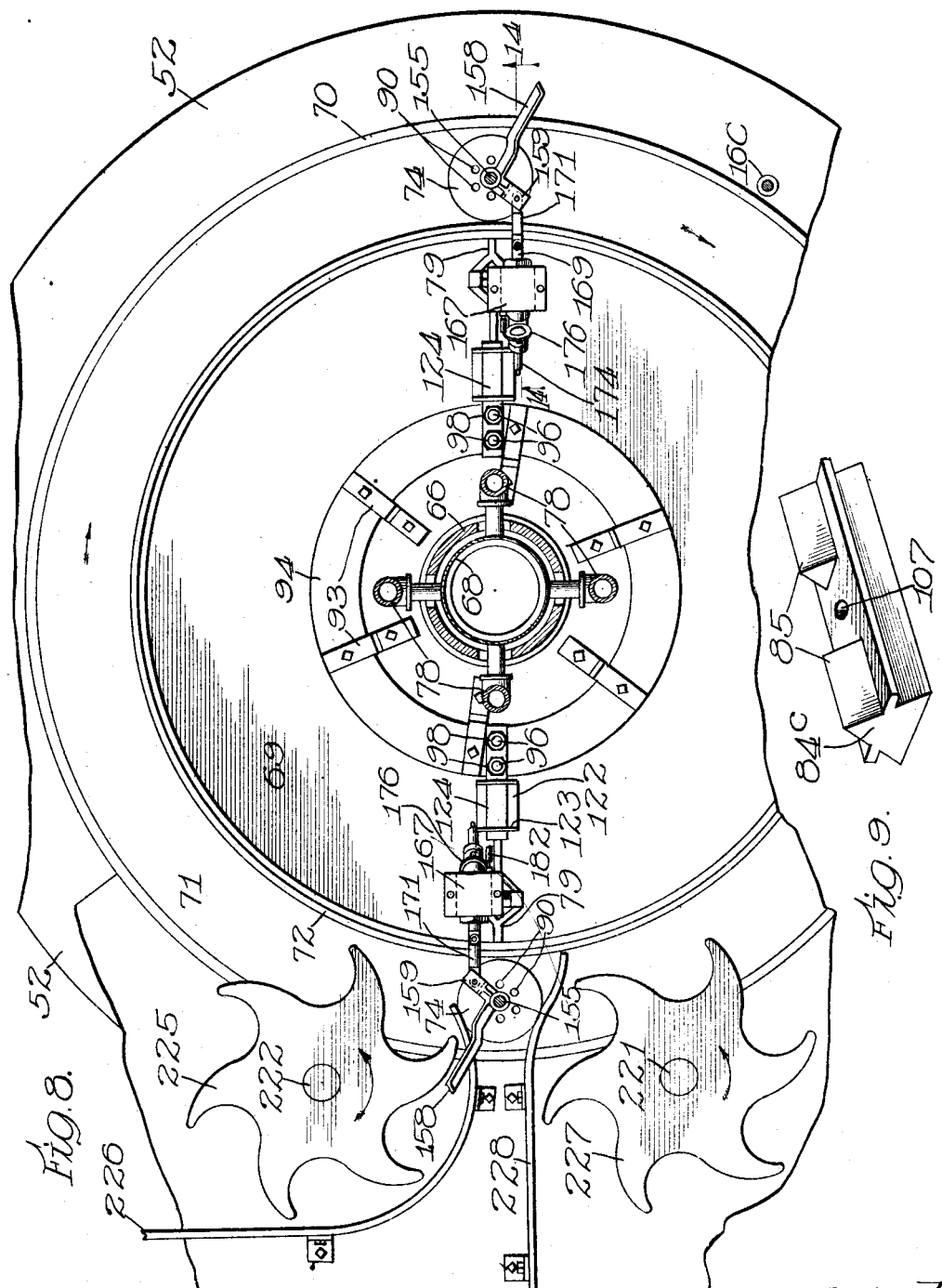

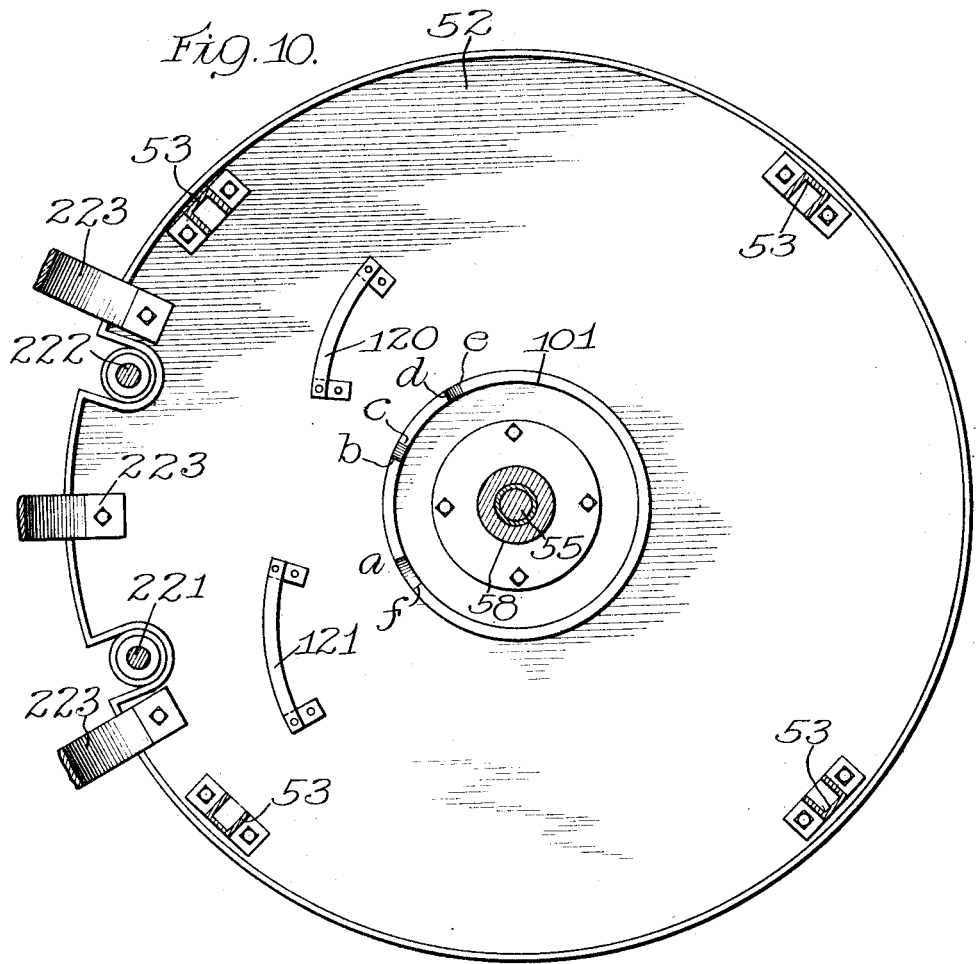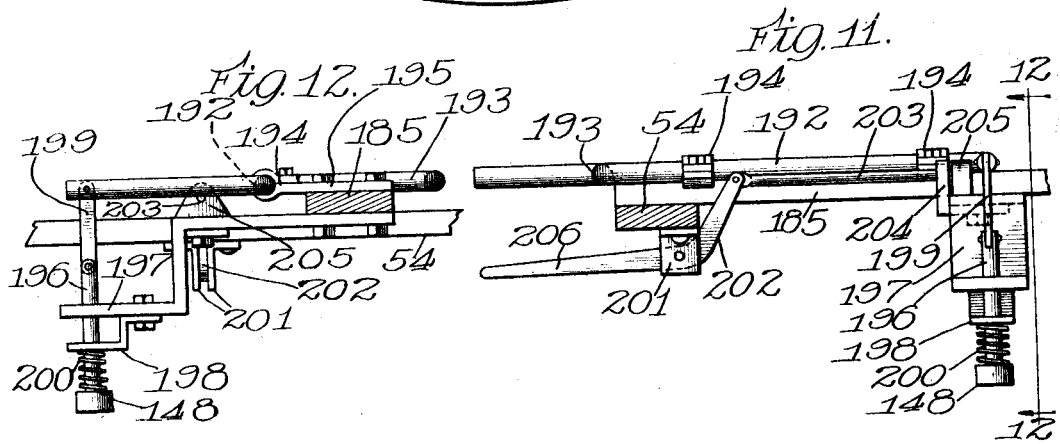

F. L. JEFFERIES & W. SPAIN.
CAN FILLING APPARATUS.
APPLICATION FILED FEB. 23, 1911.
1,079,495.
Patented Nov. 25, 1913.
13 SHEETS—SHEET 6.
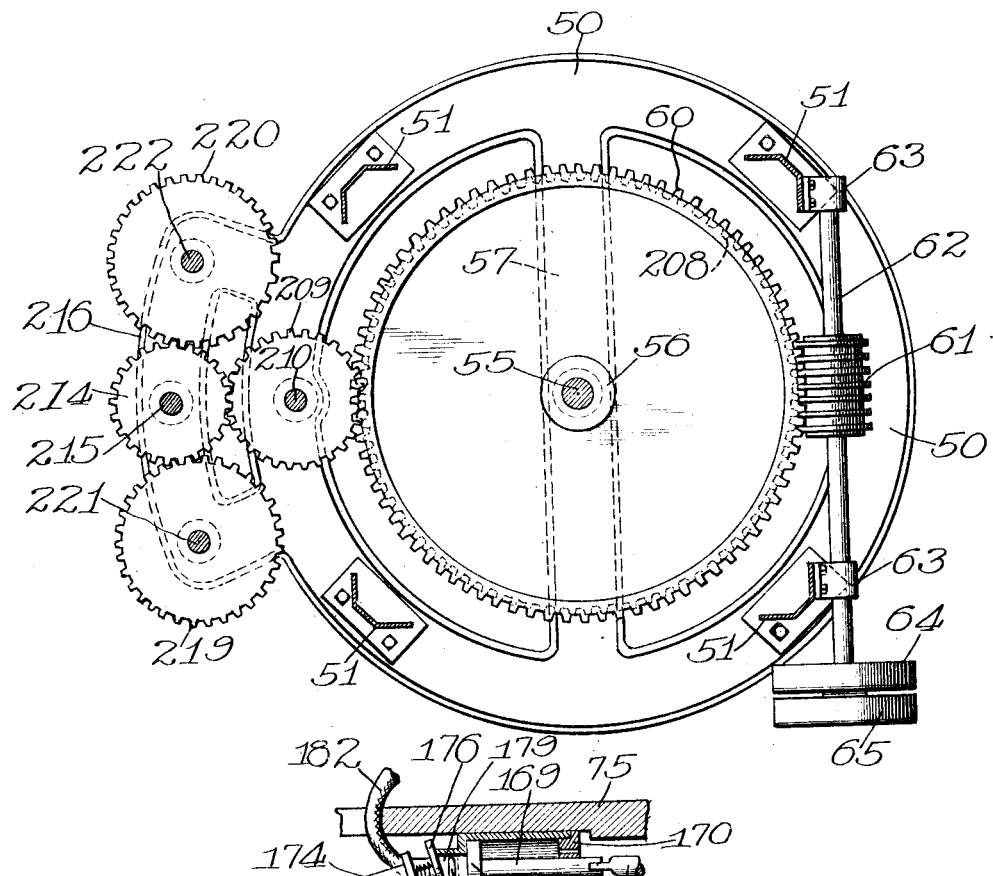
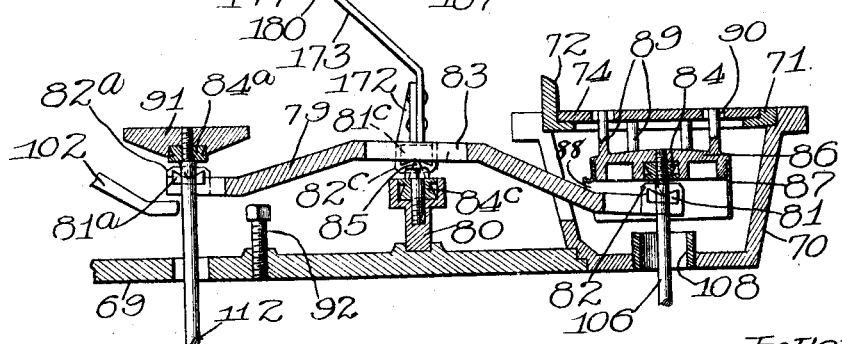
Witnesses:
Inventors
Fredrick L. Jefferies
William Spain

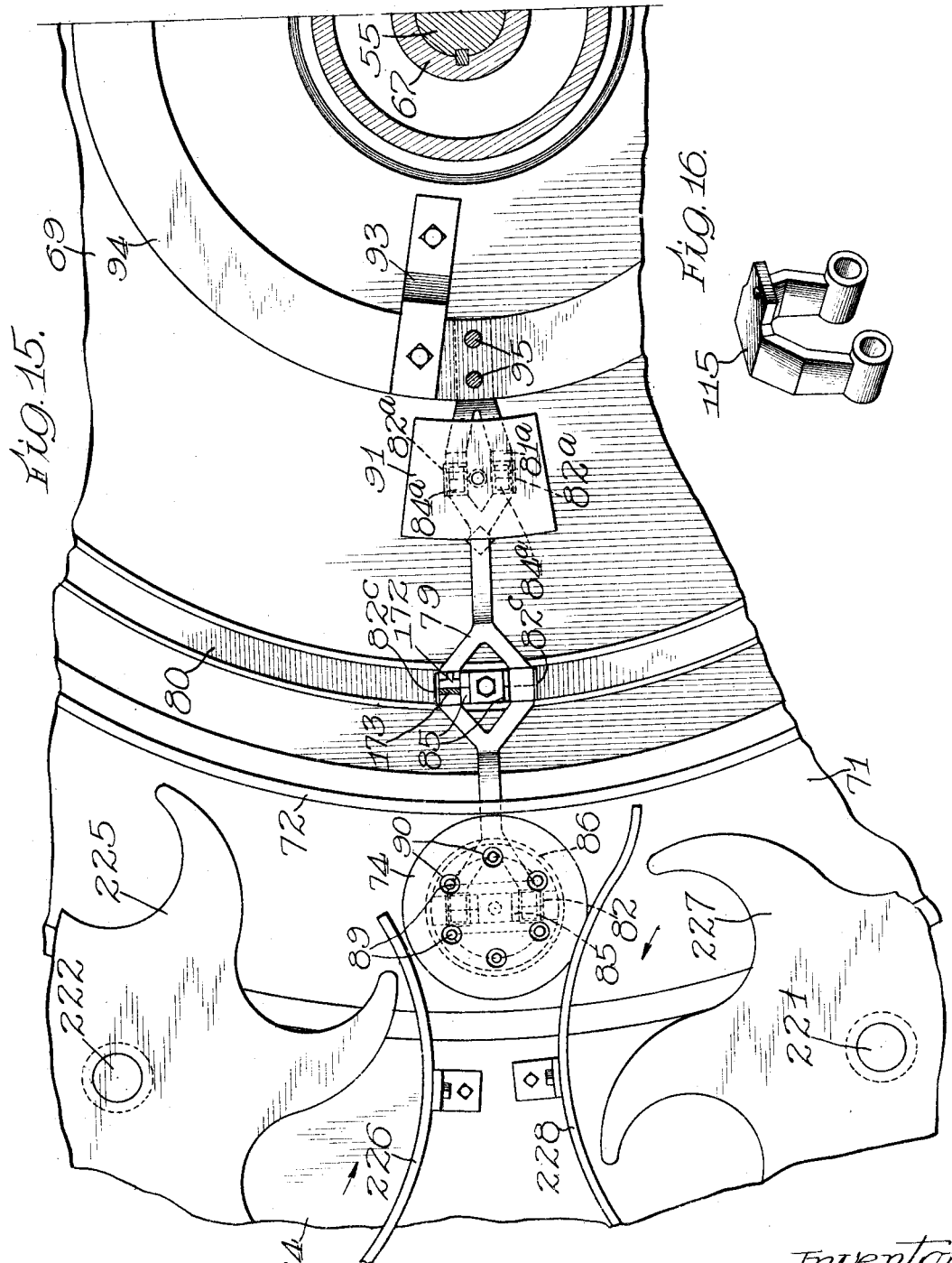

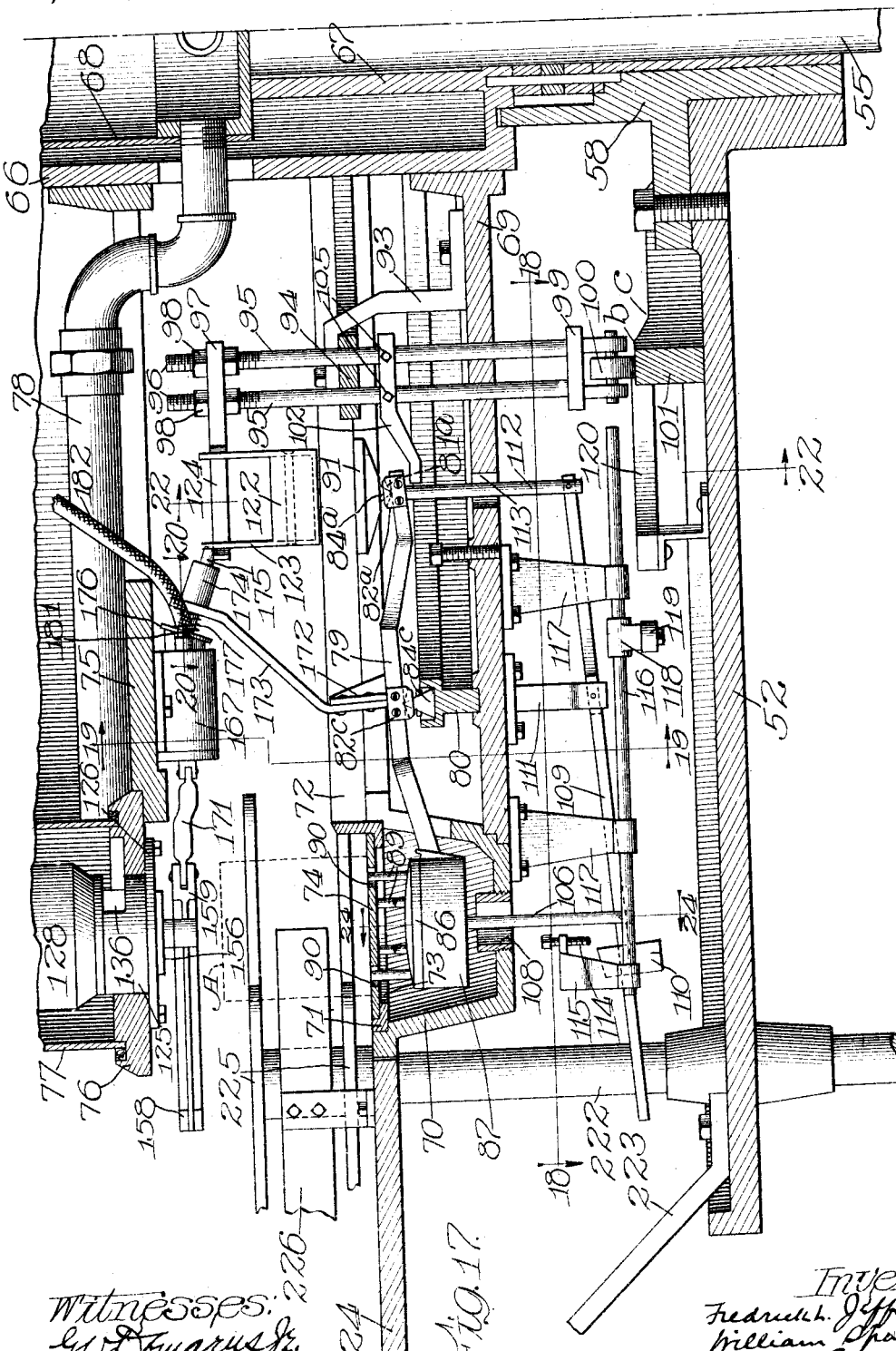

F. L. JEFFERIES & W. SPAIN.
CAN FILLING APPARATUS.
APPLICATION FILED FEB. 23, 1911.
1,079,495.
Patented Nov. 25, 1913.
13 SHEETS—SHEET 9.
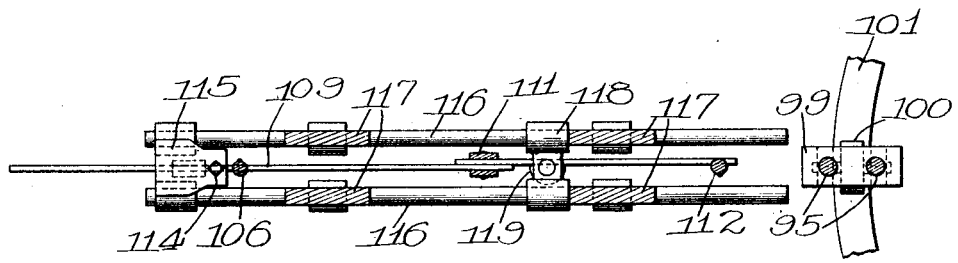
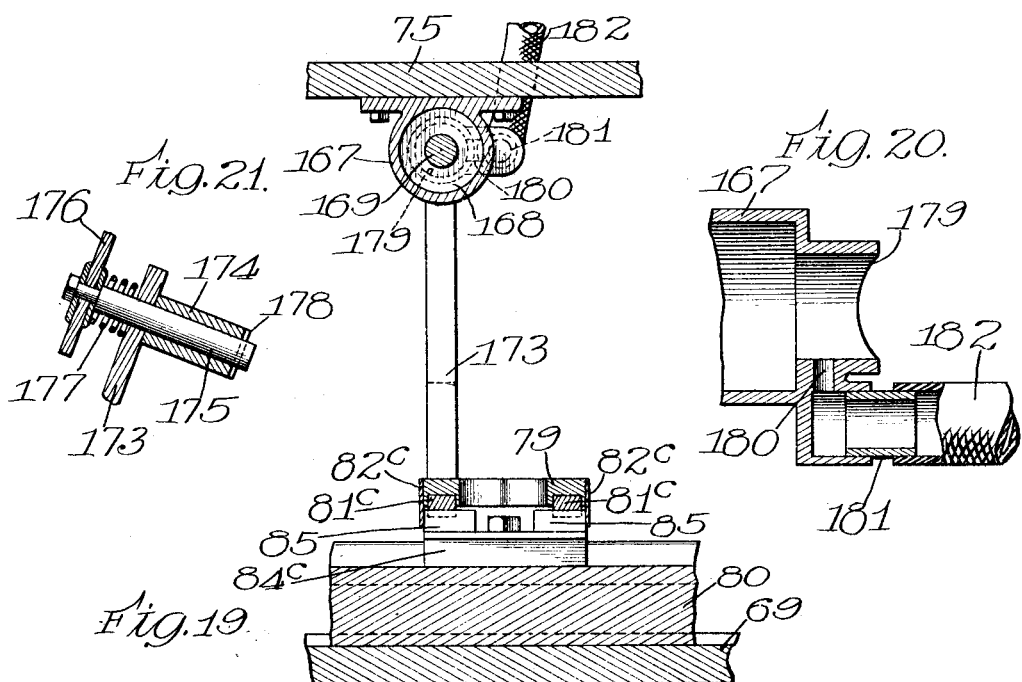
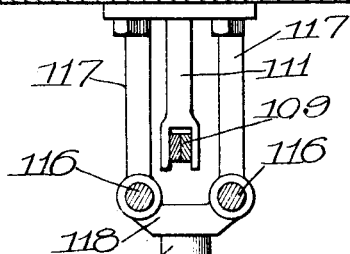

F. L. JEFFERIES & W. SPAIN.
CAN FILLING APPARATUS.
APPLICATION FILED FEB. 23, 1911.
1,079,495.
Patented Nov. 25, 1913.
13 SHEETS—SHEET 10.
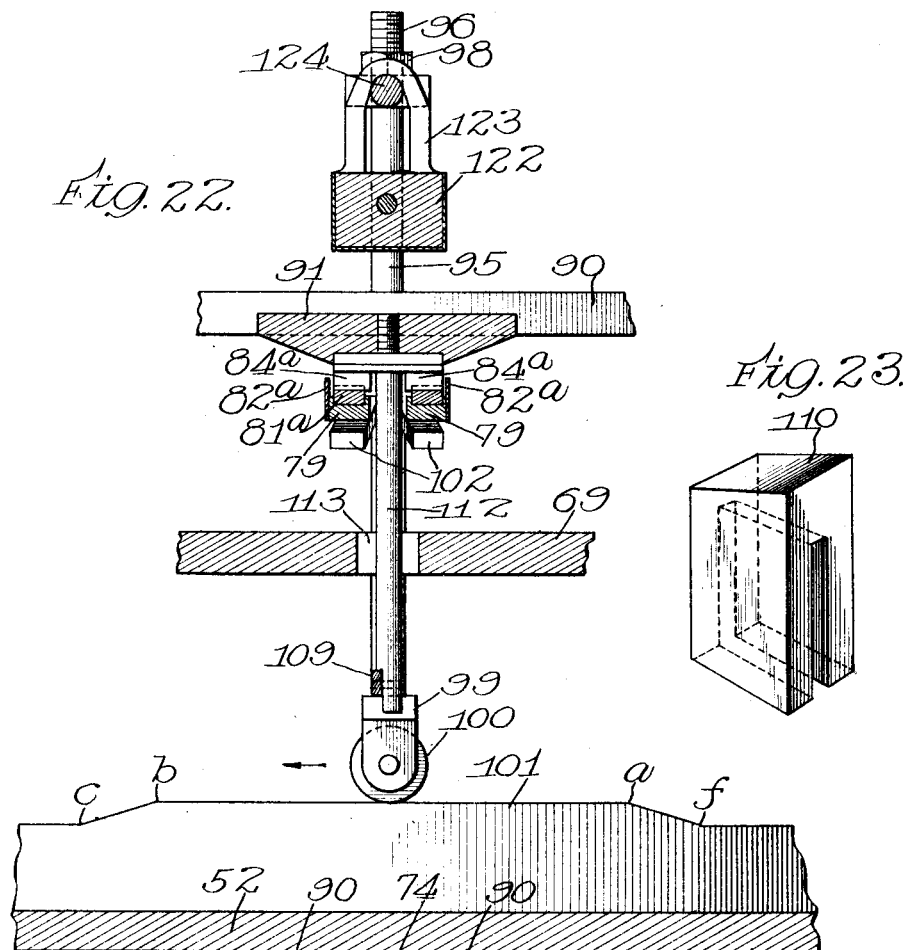
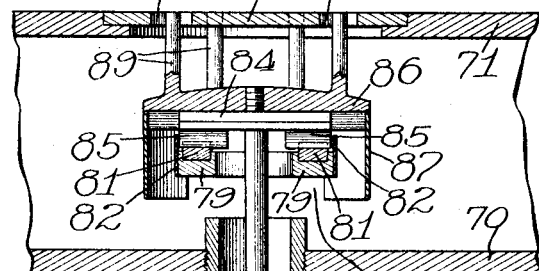

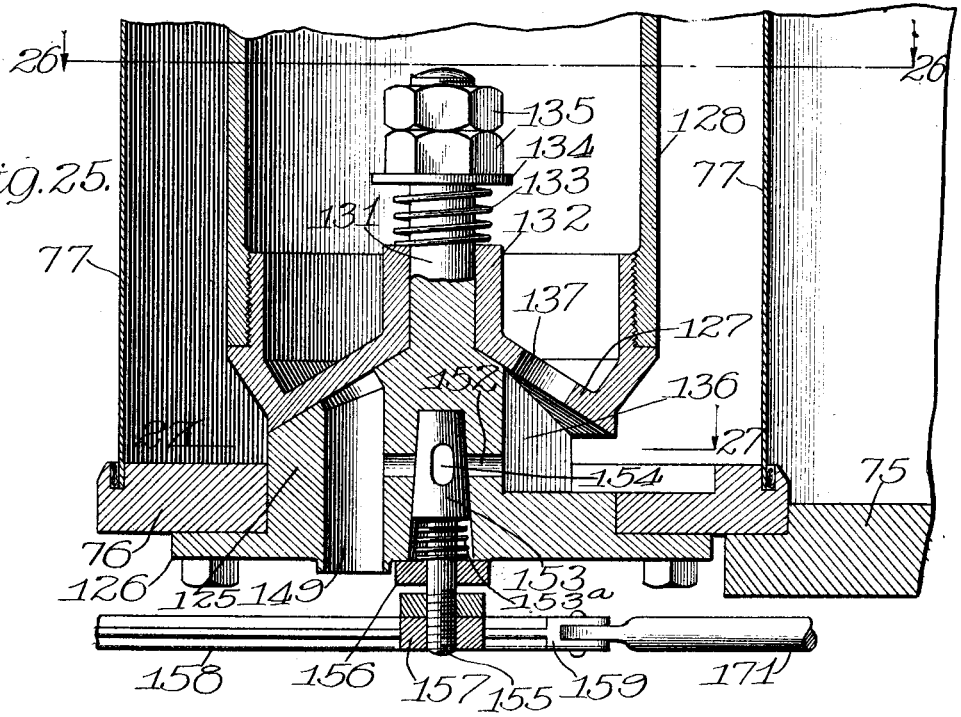
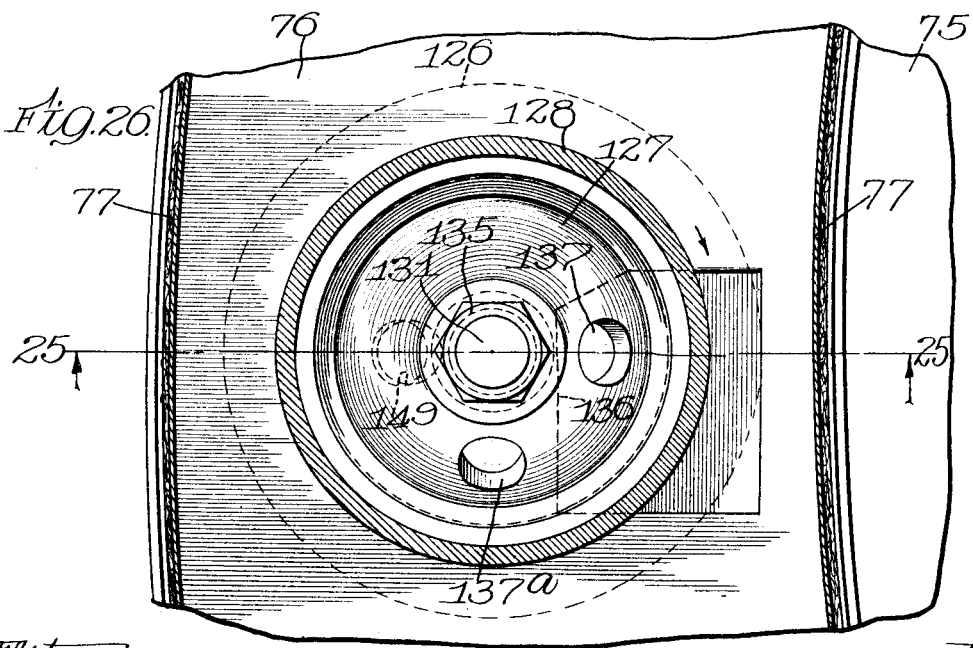

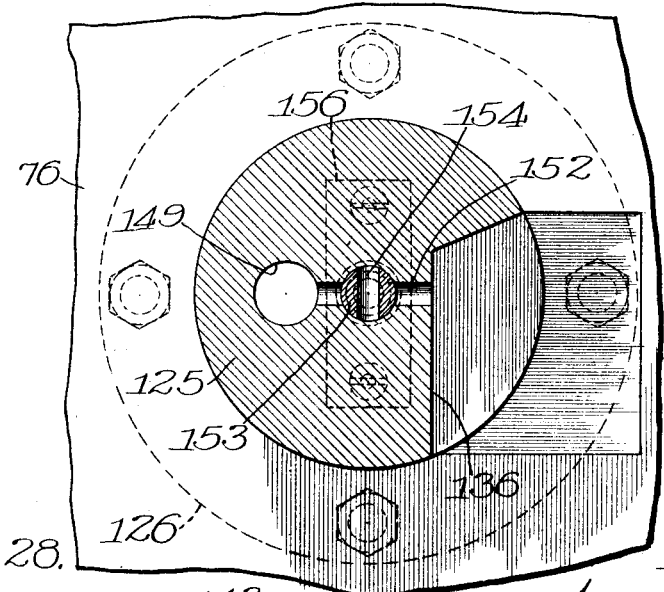
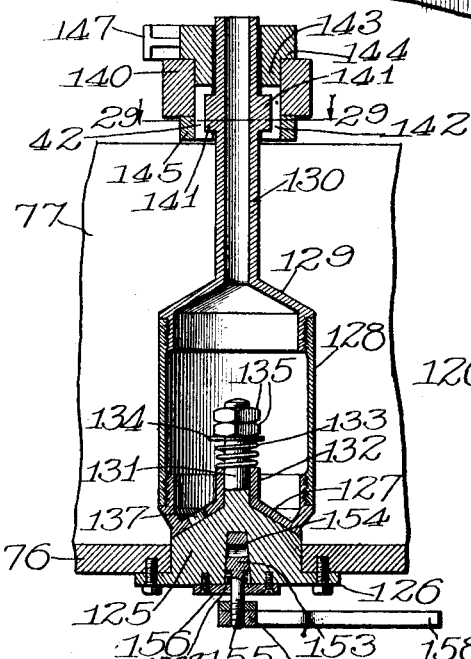
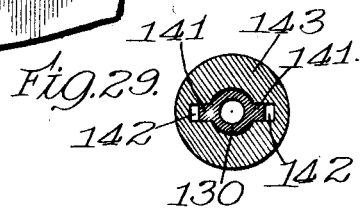
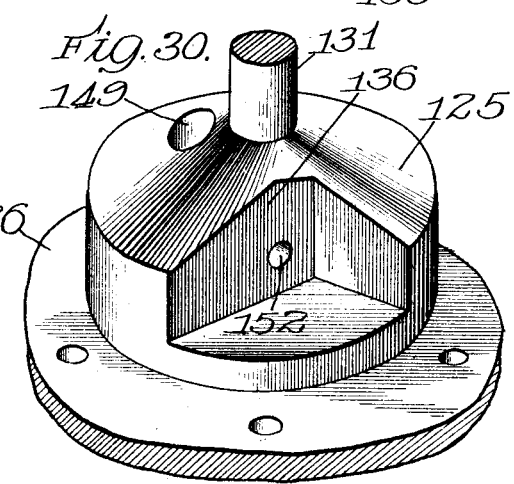

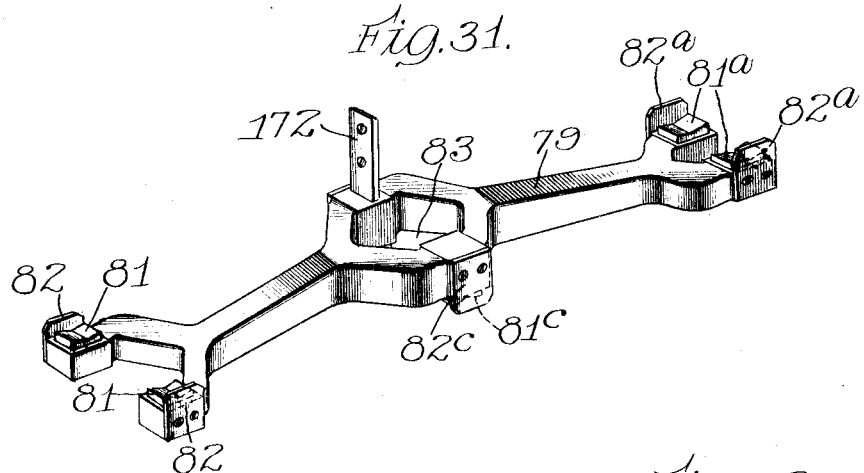
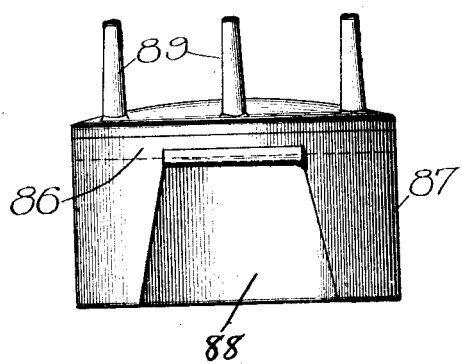
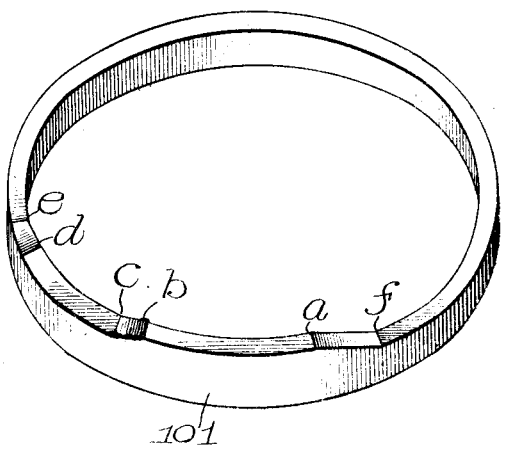
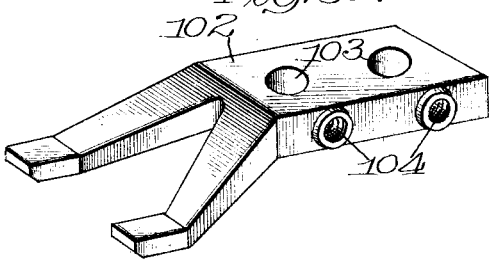

UNITED STATES PATENT OFFICE.

FREDRICK LESTER JEFFERIES, OF GRANITE CITY, ILLINOIS, AND WILLIAM SPAIN, OF ST. LOUIS, MISSOURI, ASSIGNORS TO CORN PRODUCTS REFINING COMPANY, A CORPORATION OF NEW JERSEY.

CAN-FILLING APPARATUS.

1,079,495. Specification of Letters Patent. Patented Nov. 25, 1913.

Application filed February 23, 1911. Serial No. 610,291.

*To all whom it may concern:*

Be it known that we, FREDRICK L. JEFFERIES and WILLIAM SPAIN, citizens of the United States, residing at Granite City, in the county of Madison and State of Illinois, and St. Louis, Missouri, respectively, have invented certain new and useful Improvements in Can-Filling Apparatus, of which the following is a specification.

Our invention relates to an apparatus for filling cans, or other similar vessels, and the invention has for a primary object to provide an apparatus of new and improved construction which automatically introduces into the cans, or other vessels, quantities of liquid measured by weight.

A further object of the invention is to provide a filling machine of such character and so organized that it will operate continuously on the vessels which it fills and to and from which the cans, or other vessels, may be automatically and continuously fed and discharged.

A further object of the invention is to provide a machine in which the empty cans are counterpoised before being filled so that any difference that may exist in the weights of the cans will not affect the accurate measurement by weight of the charges.

A further object of the invention is to provide a machine in which a partial filling by volume takes place first, after which the material is gradually introduced in sufficient amounts to make up the exact quantity desired.

The invention has for further objects such other new and improved constructions, arrangements and devices in filling machines as will be hereinafter described and claimed.

In the accompanying drawings is shown a machine embodying our invention, which has been designed particularly for filling tin cans with syrup; and in the following specification the machine will be described as put to this use. It will be obvious, however, that the apparatus in question might be used for other purposes.

In the drawings, Figure 1 shows a front elevation of the machine, Fig. 2, a longitudinal sectional view taken on line 2—2 of Fig. 1; Fig. 3, a detail in elevation of the dribble controlling roller; Fig. 4, a sectional plan taken on line 4—4 of Fig. 3; Fig. 5, a plan view of the machine as a whole; Fig. 6, a sectional plan taken on line 6—6 of Fig. 2; Fig. 7, a fragmentary vertical section taken on line 7—7 of Fig. 6, looking in the direction of the arrows; Fig. 8, a sectional plan on line 8—8 of Fig. 2; Fig. 9, a view, in perspective, of one of the knife edge blocks of the scale; Fig. 10, a sectional plan taken on line 10—10 of Fig. 2; Fig. 11, a sectional elevation on line 11—11 of Fig. 5, looking in the direction of the arrows; Fig. 12, a sectional elevation on line 12—12 of Fig. 11; Fig. 13, a sectional plan taken on line 13—13 of Fig. 2; Fig. 14, a sectional view on line 14—14 of Fig. 8, looking in the direction of the arrows; Fig. 15, a fragmentary sectional plan, on an enlarged scale, taken on line 15—15 of Fig. 2; Fig. 16, a detail, in perspective, of a part of the device for moving the can counterpoise; Fig. 17, an enlarged fragmentary sectional elevation taken on that part of line 2—2 of Fig. 1 between the arrows 17—17; Fig. 18, a fragmentary sectional plan taken on line 18—18 of Fig. 17; Fig. 19, a sectional view taken on line 19—19 of Fig. 17, looking in the direction of the arrows; Fig. 20, a fragmentary sectional plan taken on line 20—20 of Fig. 17; Fig. 21, a longitudinal section taken through a valve forming a part of the dribble cutoff apparatus; Fig. 22, a sectional view taken on line 22—22 of Fig. 17, looking in the direction of the arrows; Fig. 23, a view, in perspective, of the can counterpoise; Fig. 24, a sectional view taken on line 24—24 of Fig. 17, looking in the direction of the arrows; Fig. 25, a fragmentary sectional elevation taken on line 25—25 of Fig. 24, looking in the direction of the arrows; Fig. 26, a sectional plan taken on line 26—26 of Fig. 25; Fig. 27, a sectional plan taken on line 27—27 of Fig. 25; Fig. 28, a sectional view taken on line 28—28 of Fig. 2 looking in the direction of the arrows; Fig. 29, a plan section on line 29—29 of Fig. 28; Fig. 30, a fragmentary view, in perspective, of the bearing for the volume measuring vessel shown in Figs. 25 to 28 inclusive; Fig. 31, a view, in perspective, of the scale beam; Fig. 32, a view, in elevation, of one of the scale pans; Fig. 33, a view, in perspective, of the cam controlling the liquid counterpoise, and Fig. 34, a similar view of the fork for raising the weight scale pan and depressing the can scale pan.

Like characters of reference indicate like parts in the several figures of the drawings.

Generally speaking, the machine, in the preferred embodiment shown in the drawings herein, may be said to consist of a stationary element or supporting frame work; a rotary frame work or driven element rigid on a central shaft, which latter frame work carries the cans while being filled and likewise a syrup receptacle from which the cans are filled; a plurality of scales one for each can; mechanism for counterbalancing the empty cans when they are first received into the machine before the filling operation commences; volume measuring vessels which discharge into the cans approximately uniform quantities of syrup measured by volume; mechanism for placing on the scales, at the proper time, counterpoises for determining, by weight, the amounts of syrup which the cans are eventually to receive, and for removing said counterpoises when the weighing operation is completed; valve mechanism which opens dribble ports in the filling tank through which syrup is introduced into the cans in relatively small streams, and which closes said ports when the cans balance; mechanism for automatically feeding the cans into and discharging them when filled from the machine; and certain shut-off devices which can be used in cases of emergency to prevent the waste of the syrup.

While all of the sets of instrumentalities above enumerated are preferably employed in combination, it will be obvious that a machine might be constructed, having some utility, in which some of the above mentioned mechanisms should be omitted; and likewise, that instead of using all of the sets of mechanisms as shown, different mechanisms performing substantially the same operations might be substituted for some of those which we herein show and describe. While the apparatus is designed particularly for handling liquids, certain of the sets of instrumentalities making up the machine in its preferred form might perhaps be useful in apparatus operating upon dry material.

The several sets of mechanisms shown in the drawings will now be described in substantially the order above given. It may be noted that while a complete machine contemplates a considerable number of units in substantially radial arrangement around the central shaft of the machine, the units operating successively and being arranged close enough together so that the cans to be filled may be fed one after another at very short intervals into the machine, for the purpose of clearness of illustration the drawings have been made to show only two of said units, these two being in diametrical arrangement, certain of the figures, however, indicating the intervening units.

*The stationary and rotating frames.*—50 designates an annular base supporting the uprights 51 which carry the circular table 52 (Figs. 1 and 2). On this table are the uprights 53 supporting a ring 54. The central shaft 55 of the machine turns at its lower end in a bearing 56, formed in a transverse base member 57 (Fig. 13), and farther up in the hub 58 seated in the boss 59 formed on the table 52. Shaft 55 carries a worm wheel 60 meshed by a worm 61 carried on a shaft 62 mounted in bearings 63 secured to one pair of the uprights 51. Shaft 62 carries the fast and loose pulleys 64, 65. Keyed to the upper end of shaft 55 is a hollow cylindrical member or drum 66 on the internal hub of which 67, rests a tank or vessel 68 which is designed to receive the syrup with which the cans are to be filled. The syrup may be fed into the receiving tank 68 in any desired manner. No particular means is shown. Rigidly secured to the lower end of drum 66 is a circular plate or table 69 on the rabbeted perimeter of which is supported the annular dish-like member 70. In rabbets in the edges of member 70 is seated a ring 71 (Figs. 14 and 17) having at its inner edge the upstanding flange 72. The ring is formed with a series of circular openings 73 covered by perforated plates 74. The cans, when fed into the machine, are designed to stand on the plates 74. Secured to the drum 66 above table 69 is a circular plate 75 carrying, seated in a rabbet at its circumference a ring 76 which forms the bottom of the annular filling tank 77. Tank 77 is connected with tank 68 by the pipes 78 which extend through openings in drum 66 and plate 75.

*The scales.*—The scale beam 79 (Fig. 31) is mounted on a stud 80 (Fig. 17) on plate 69. The bifurcated ends of the beam are provided with the notched blocks 81, 81, 81$^a$, 81$^a$ and with guide plates 82, 82, 82$^a$, 82$^a$. There are similar notched blocks 81$^c$ and guide plates 82$^c$ in reverse position at the center of the beam on opposite sides of the central opening 83. In a recess in the top of stud 80 is a block 84$^c$ being formed on its upper surface with the two knife edges 85 (Fig. 9) spaced apart so as to support the notched blocks 81$^c$.

86 designates one of the scale pans (Figs. 17, 24 and 32) provided on its under side with the knife edge block 84, such as that shown in Fig. 9, the knives of which 85, 85, bear upon notched blocks 81, 81 at one end of scale beam 79. These parts are preferably shielded by the flange 87 having an opening 88 for the scale beam. Scale pan 86 is formed with the upstanding prongs 89 which extend through the perforations 90 in the circular plate 74. The can, designated A in the drawings, is supported on these prongs during the weighing operations. The weight pan 91 is provided on its under surface with the knife edge block 84ª, similar to that shown in Fig. 9, the knives of which bear upon the notched blocks 81ª, 81ª. A set screw 92 affords a rest for this end of the scale beam so as to prevent it from going down too far.

*The mechanism for holding the scale out of operation and for releasing the same.*—Bolted to plate 69 are the brackets 93 which support a ring 94 (Figs. 8 and 17). Ring 94 is perforated for the pair of rods 95, the threaded ends of which, 96, extend through and are secured to the cap piece 97 by the nuts 98. The lower ends of rods 95 are seated in a base 99 carrying on its under side the rolller 100 adapted to travel on the circular cam 101 (Fig. 33). A forked member 102 (Fig. 34) is formed with the perforations 103 to receive the rods 95 and is formed on one edge with the taps 104 for set screws 105 (Fig. 17) by means of which it may be adjustably secured to rods 95. The adjustment of this device is such that it engages with the end of the scale beam 79 carrying the weight pan 91 when roller 100 is at the high portion of the cam *a—b* (Figs. 22 and 33) so as to tilt scale beam 79 sufficiently to depress prongs 89 on the can scale pan to the level of or below the upper surface of plate 74. This is the position of the scale when the can is placed on the plate 74 and the prongs 89 are so depressed in order to allow the can to be slid to its proper position on the plate; that is, in order to allow the automatic feeding of the cans which will be hereinafter described. Cam 101 (Figs. 22 and 33) is sharply inclined from *b* to *c*, then follows a horizontal interval from *c* to *d*. The fork 102 releases the scale beam when the roller 100 moves from *b* to *c*. From *c* to *d* the empty can is weighed.

*Mechanism for weighing the empty can.*—A rod 106 extends through the perforation 107 (Fig. 9) in the knife edge block 84 on the under side of scale pan 86 and is threaded into the scale pan (Fig. 24). The rod passes through an opening 108 in the bottom of the annular member 70 and pivotally supports the weight beam 109 which, beyond this point of connection, carries the bifurcated can weight 110 (Figs. 17, 23 and 24). The beam 109 is pivotally supported on a bracket 111 bolted to the under side of plate 69 and is connected at the other end to the weight pan 91 by the rod 112 which, extending through an opening 113 in plate 69, is threaded, in the manner above described in connection with rod 106 and scale pan 86, into the weight pan 91 (Figs. 17 and 22). The weight is pushed out and back on beam 109 by means of a set screw 114 in a bracket 115 (Figs. 16 and 17) which is carried on the end of a pair of rods 116 (Fig. 18) sliding through suitable bearings formed in the brackets 117 bolted to the under side of plate 69. Rigidly carried on the rods 116 is a block 118 supporting an anti-friction roller 119 which, in the first part of the circular travel of the can handling unit in question, comes into contact with the outer surface of an eccentrically placed cam 120 bolted to the upper surface of the stationary table 52 (Fig. 10). This causes the rods 116 to be forced outwardly. The scale as a whole is so proportioned that with weight 110 at its initial inner position the side of the scale carrying the can, even plus the weight of the can, will not overbalance the other side of the scale. Therefore weight 110 which stands outwardly of set screw 114 is moved outwardly by the set screw so long as the weight does not overbalance this side of the scale. As soon, however, as the movement of weight 110 overbalances the scale the set screw rides over the weight without moving it, completing the movement enforced by its engagement with cam 120. No change is made in the position of the weight during the filling of the can which follows. When this has been completed roller 119 meets the inner surface of cam 121 (Fig. 10) which causes the rods to be moved into their initial position. At this time the set screw stands outwardly of the weight 110 and as the scale is in balance the inward movement of the rods 116 pushes the weight 110 inwardly to its proper initial position, cam 121 being so placed on the table 52 as to accomplish this result. Before roller 119 leaves cam 121 the roller 100 has ridden up on the section *a—b* of cam 101 (Figs. 22 and 33) causing the fork 102 to engage with the scale beam 79 and tilt the same so as to depress the prongs 89 on scale pan 87 to or below the level of the can supporting plate 74. This movement also tilts beam 109 so that weight 110 is disengaged from set screw 114 which, as rods 116 move inwardly, allows the set screw to pass over the weight to its initial position inwardly thereof. While prongs 89 are down the filled can is discharged from the machine by a mechanism which will be hereinafter described.

*The counterpoise for weighing the liquid.*—The rods 95, described as carrying the forked member 102, which tilts scale beam 79, support a weight 122 formed with the slotted arms 123 by means of which it is carried on a rod 124 projecting from the cap piece 97 (Figs. 17 and 22). When roller 100 rides down the incline *b—c* on cam 101 to release the scale beam 79 the movement is not sufficient to bring weight 122 into contact with weight pan 91. The weight, however, comes down upon the weight pan when roller 100 reaches the bottom of the incline *d—e* on cam 101 (Fig. 33). It remains on the weight pan while the roller moves from *e* to *f*, this part of the cam ring being of uniform height. From *f* to *a* there is an upward inclination which raises the weight from the weight pan and brings the fork member 102 against beam 79 to tilt the latter, as above described. While the roller is passing from *e* to *f* the can is filled first by the volume filling operation and afterward with enough liquid through the dribble port to make up the desired charge by weight. It is obvious that the weight might be lowered upon the scale at any time before the dribble port is opened.

*The volume filling operation.*—The ring 76, which forms the bottom of the filling tank 77, is formed with a plurality of circular openings through which project the conical pivot members 125 formed on plates 126 bolted to the under side of the ring 76 (Figs. 17, 25, 28 and 30). Each of these pivot members supports, revolubly, a filling vessel consisting of a conical base 127, a cylindrical part 128, and a conical part 129 terminating in the spindle 130. Preferably the pivot member 125 is formed on its upper end with a threaded stud 131 extending through an internal flange 132 on the base member 127. A spiral spring 133 is introduced between flange 132 and a washer 134 bearing against the nuts 135 on stud 131. A portion of the pivot member 125 is cut away forming an opening 136 under a part of the base member 127 of the filling vessel, and the latter is pierced with ports 137, 137$^a$. With the filling vessel turned to bring port 137 over opening 136 the syrup in the filling tank 77 will flow into measuring vessel 128.

To drum 66, forming a part of the rotating frame work of the machine, is secured a ring 138 supporting at its circumference a ring 139 (Figs. 2 and 5) formed with a plurality of brackets 140. These brackets support the upper ends of the several measuring devices. The construction of this part of the machine is shown particularly in Figs. 28 and 29. The spindle 130 is formed with the wings 141 which project into slots 142 formed in the bore of a hub 143 formed with a shoulder 144 standing above bracket 140 and provided with a collar 145 below the bracket. The hub 143 carries the arms 146, 147 (Figs. 2 and 5), the ends of which are preferably beveled. The beveled end of arm 146 meets a roller 148 supported from the stationary ring 54, as will be hereinafter described, and is turned from the full line position at the left hand side of Fig. 5 to the dotted line position shown in the upper part of the figure. The engagement of arm 146 with roller 148 revolves the measuring vessel 128 so as to bring port 137$^a$ into register with a port 149 through the pivot member 125 (Fig. 25). Plate 74 is so placed that the can which it supports is directly under port 49. Assuming that the measuring vessel 128 is full, or partly full, of syrup, with the parts in the position described the syrup will be discharged into the can. Ports 137$^a$ and 149 remain in register until arm 147 meets a roller 150 which is supported on a bracket 151 bolted to the ring 54. This engagement rocks the arms back to their original position, as indicated by the dotted line positions of the arms at the right hand side of Fig. 5, and the measuring vessel is turned so as to bring port 137 over the opening 136 in the pivot member 125 (Figs. 25 and 26). Liquid from tank 77 will now flow up into the measuring vessel 128. It will, of course, rise in each of the measuring vessels to the level of the liquid in the tank 77 in which these vessels stand. Therefore by maintaining an even level of syrup in tank 77 an accurate measurement of the volume charges, or at least one which is sufficiently accurate for all intents and purposes, results. Port 137 stands over the opening 136 until the arm 146 again meets roller 148, in the manner above described.

*The dribble and mechanism for starting and cutting it off.*—The pivot member 125 is formed with a port 152 (Figs. 25, 27 and 30) extending from port 149 to the opening 136. Midway of this port is a valve 153 formed with the port 154 adapted to register with the two sections of port 152. Valve 153 engaged by spring 153$^a$ has a stem 155 extending through a strip 156 bolted to the under side of plate 126 (Figs. 25, 27 and 28) and is threaded into a hub 157 carrying the angularly disposed arms 158 and 159 (Fig. 8). Very shortly after the measuring vessel is turned to close port 149 by the engagement of arm 147 with roller 150, arm 158 meets a roller 160 (Fig. 8) which is carried by an angular arm 161 pivoted at 162 to one of the uprights 53 (Figs. 1, 3 and 4). The other end of arm 160 from that carrying the roller has a handle 163 and the arm is held either against pin 164 or pin 165 by a spring 166. With the arm bearing against pin 164 the roller 160 stands in the path of arm 158. By engagement of arm 158 with roller 160 valve 153 is rocked so as to bring port 154 into alinement with port 152 and the syrup from tank 77 flows in a relatively small stream through ports 152, 154 and 149 into the can. Roller 160 is arranged so that it may be moved out of the path of the arms 158 controlling the opening of the several dribble valves in order that the syrup may be prevented from wasting in case anything goes wrong with the operation of the machine.

The closing of the dribble port is effected preferably by a vacuum mechanism actuated by the balancing of the scale. To the under side of plate 75 is secured a cylinder 167 (Figs. 2, 14 and 17) in which is a piston 168 having a rod 169 extending through the perforated head 170 of the cylinder and being connected by a link 171 with the arm 159 which has been described as rigid with the arm 158 which shifts the dribble valve. When the arm 158 meets the roller 160 and is rocked thereby to open the dribble valve, arm 159 is rocked to a position which brings the piston 168 close to the head 170. The scale beam 79 carries a lug 172 to which is secured an arm 173 on which is a boss 174 (Fig. 21). The stem 175 of a valve 176 extends through boss 174. A spiral spring 177 is introduced between arm 173 and the valve. The stem 175 has the pin 178 which bears against boss 174. Valve 176 is adapted to close a port 179 (Figs. 14 and 20) in the end of cylinder 167 opposite the head 170. A port 180 leads from port 179 to the interior of a nipple 181 for the flexible tube 182. The tube 182 leads to an exhaust pump (not shown) by connections which will be hereinafter described. It will be seen that when the weight of the liquid in the can counterbalances weight 122 on weight pan 91, valve 176 closes port 179. Before this the exhaust pump sucked air through port 179. With this port closed the air is immediately exhausted from the cylinder 167 and the piston 168, which, by roller 160 was previously drawn close to head 170, is now moved in the opposite direction. This shifts the dribble valve 153 back to its original position closing the dribble port 152.

As the cylinders 167 rotate with the other operative parts of the machine it is necessary, if the exhaust pump is stationary, to provide connections between the tubes 182 and the exhaust pump which will permit the tubes to be moved with the other rotary parts of the machine. A suitable arrangement is shown in Figs. 2, 5, 6 and 7. A ring 183 is supported by means of rods 184 from frame members 185 bolted to and extending across circular frame member 54. Ring 183 is formed with an arcuate groove 186 and with one or more recesses 187 extending back from this groove. Pipes 188 lead from the recesses 187 to the exhaust pump. Surrounding ring 183, the face of which is preferably beveled, is a ring 189 formed with a plurality of radial ports 190. Two of these are shown in Fig. 6. There will, of course, be one for each set of weighing mechanisms. Ports 190 lead to nipples 191 to which the upper ends of tubes 182 are connected. The groove 186 in the inner or stationary ring 183 is so placed that any given port 190 in the outer or movable ring 189 comes opposite to it about the time the dribble valve of the mechanism concerned is opened. During the period that the port 190 is opposite groove 186 the exhaust pump is sucking air through the corresponding tube 182. It is during this period that valve 176 is closed by the balancing of the scale which causes the suction to operate on piston 168 and thereby close the dribble valve.

In case any accident should happen to the machine it is desirable that means be at hand for shutting off the flow of syrup through the dribble port and from the measuring vessels. We have already described the means whereby the roll 160 which opens the dribble port can be turned out of the path of the rocking arms operating the dribble valve. Preferably the roller 148 which opens the discharge ports from the measuring vessels is similarly mounted on the machine, as shown particularly in Figs. 1, 2, 5, 11 and 12. An angular rock arm 192 provided with a crank 193 is mounted in keepers 194 on brackets 195 bolted to one of the cross frame members 185. The roller 148 is carried on the end of a rod 196 which extends through a bracket 197 bolted to frame member 185 and through a bracket 198 bolted to the under side of bracket 196. Rod 196 is connected with the end of the rock shaft 192 by a link 199. A spring 200 is interposed between the roller 148 and the lower bracket 198. Pivoted to bracket 201 on the under side of ring 54 is a bent arm 202 to which is pivoted a link 203 guided in a lug 204 on the bracket 197 and provided with a head 205 which, by pulling up on the handle end 206 of the bent arm 202 can be slid under the inner end of the rock shaft 192 when the latter is tilted. Roller 148 may thus be lifted and held out of the path of the rock arms which rotate the measuring vessels into their discharging positions.

*Mechanism for feeding the cans into and discharging them from the machine.*—The central shaft 55 of the machine carries rigidly thereon the gear wheel 208 which meshes with a gear wheel 209 on a shaft 210 mounted in a bearing 211 in the base member 50 and, at its upper end, in a bearing 212 on a bracket 213 bolted to the under side of the stationary table 52. Gear wheel 209 meshes with a gear 214 on a shaft 215 mounted, at its lower end, in a projecting part 216 of base member 50 and, at its upper end, in a bearing 217 on a bracket 218 secured to the under side of table 52. Gear 214 meshes with the gears 219 and 220 carried on shafts 221 and 222 respectively, mounted similarly to shaft 215. Supported by brackets 223 extending upwardly from table 52 is a can receiving and delivery table 224 at the level of plates 74 (Figs. 2 and 17). Shaft 222 extends through the table 224 and carries the star wheels 225 (Figs. 1, 8, 15 and 17). The cans are fed upon table 224 against a guide 226 which is curved around the star wheels 225 and extends part way over the rotating part of the machine. Similarly shaft 221 extends through table 224 and is provided with the star wheels 227, which rotate in the same direction as the wheels 225. The wheels 227 operate against a guide 228 which likewise projects into the path of the cans. Guides 226 and 228 are bolted to the table 224.

The operation of the machine above described may be resumed as follows: The cans are fed upon table 224 against the guide 226 and are taken one by one by the star wheels 225 and pushed upon the plates 74 above the several scale pans 87. At this time roller 100 of the particular unit concerned is moved over the high part $a$—$b$ of cam 101 so that the fork member 102 holds the prongs 89 on the scale pan out of the way of the can. Roller 100 then moves down the incline $b$—$c$, the scale beam is released and as the side of the scale carrying the can is lighter than the other side the prongs 89 raise the can from plate 74. Roller 119 now comes into contact with the cam 120 on table 52 and the weight 110, which is designed to counterpoise the can, is pushed outwardly on the beam 109 until the side of the scale supporting the can is counterbalanced. Then set screw 114 rides over the top of weight 110 in position to return the weight when the can has been filled. The weighing of the empty can takes place while roller 100 is passing from $c$ to $d$ on cam 101. Roller 100 now rides down the incline $d$—$e$ and this places the weight for counterpoising the syrup upon the weight pan 91. Up to this time the measuring vessel for giving the can its volume fill has been standing with its port 137 over the opening 136 in pivot member 125 and is therefore filled with syrup to the level of the syrup in tank 77. Arm 146 now comes into contact with the roller 148 and is rocked so as to shift port 137 away from the opening 136 and port 137$^a$ into register with port 149. Communication between the measuring vessel and the tank 77 is closed and the contents of the measuring vessel is discharged into the can. The arm 147, diametrically arranged with respect to arm 146, then meets the roller 150 and this turns the measuring vessel back to its original place covering port 149 and bringing the measuring vessel into communication with tank 77 through port 137 and the opening 136. The measuring vessel now fills in readiness for the can which will be fed into the machine during the next cycle. The dribble port 152 is next opened by the shifting of valve 153 which is brought about when arm 158 comes into contact with the roller 160. The same movement carries the piston 168 to the outer end of cylinder 167. About the same time the port 190 in ring 189 comes opposite the groove 186 in the stationary ring 183. Valve 176 stands away from port 179 at the end of the cylinder so that for the present the exhaust pump is open to the atmosphere. As soon, however, as the weight of the liquid in the can, which is increased by the dribble, overbalances weight 122, port 179 is closed by valve 176, the air is exhausted from cylinder 167, piston 168 is drawn to the inner end of the cylinder and the dribble valve is turned to a position which closes the dribble port 152. The can is now filled with a quantity of the syrup which has been accurately measured by weight. The weighing takes place while roller 100 is moving from $e$ to $f$ on cam 101. The roller then goes up the incline $f$—$a$ and this brings the fork member 102 into contact with scale beam 79 lowering the prongs 89 so that the can now stands again on plate 74. A further movement of the rotary part of the machine brings the can against guide 228 at which point it is engaged by the star wheels 227 and moved across plate 74, ring 71, and the upper surface of the annular member 70 to the stationary table 224.

While we have shown a preferred form of apparatus for carrying out the invention it will be readily understood by those who are familiar with machinery of this general sort that modifications might be made in the forms, constructions and devices employed without departure from our invention; therefore we do not limit ourselves to the particulars shown and described except so far as the same are made specifically limitations on certain of the claims herein.

In certain of the claims the devices and mechanisms constituting the inventions claimed are referred to as adapted for the handling of cans. It is not the intention, however, to limit the claims by the use of the term "cans" as it will be obvious that our machine might be employed for filling other species of receptacles. The machine is particularly intended for measuring and weighing liquids but it is possible that certain of the devices going to make up the complete machine in its preferred form might be used in filling operations in which granular, pulverulent or other freely running solids were handled instead of liquids.

We claim:

1. In apparatus of the character described, the combination with a movable support for a receptacle, of a scale which moves with said support and is provided with means adapted to engage the receptacle, lift it from the support and sustain it during the weighing operation.

2. In apparatus of the character described, the combination with a movable support for a receptacle, of a scale which moves with said support and is provided with means adapted to project through the said support, lift the receptacle from said support, and sustain it during the weighing operation.

3. In apparatus of the character described, the combination with a support for a receptacle having a flat surface over which the can may be slid, of a scale provided with means adapted to project through the said support, engage and lift the receptacle from said support, and sustain it during the weighing operation, and means for automatically depressing said engaging means so that it does not interfere with the movement of the receptacle across said support.

4. In apparatus of the character described, the combination with a movable support for a receptacle, of a scale which moves with said support and is provided with means adapted to project through the said support, engage and lift the receptacle from said support, and sustain it during the weighing operation, means for automatically depressing said engaging means so that it does not interfere with the movement of the receptacle across said support, and means for feeding receptacles on said support when said engaging means is so depressed.

5. In apparatus of the character described, the combination with a movable support for a receptacle, of a scale which moves with said support and is provided with means adapted to project through the said support, engage and lift the receptacle from said support, and sustain it during the weighing operation, means for automatically depressing said engaging means so that it does not interfere with the movement of the receptacle across said support, and means for removing the receptacles from said support when said engaging means is so depressed.

6. In apparatus of the character described, the combination with a movable support for a receptacle, of a scale which moves with said support and is provided with means adapted to project through the said support, engage and lift the receptacle from said support, and sustain it during the weighing operation, means for automatically depressing said engaging means so that it does not interefere with the movement of the receptacle across said support, and means for discharging the filled receptacle from said support and for feeding an empty receptacle thereon while said engaging means is so depressed.

7. In apparatus of the character described, the combination with a support for a receptacle, of a scale provided with means adapted to engage the receptacle, lift it from said support, and sustain it during the weighing operation, means for moving said engaging means out of engaging position, and means for sliding the receptacle across said support.

8. In apparatus of the character described, the combination with a stationary table, of a movable support for a receptacle in the same plane therewith, said support being formed with perforations, a scale provided with means adapted to extend through said perforations, lift the receptacle from the supporting element and sustain it during the weighing operation, means for depressing said projecting means to the level of said support, and means for sliding the receptacle from the table to said support and vice versa while said projecting means is depressed.

9. In apparatus of the character described, the combination with a support for the receptacles, the upper surface of which is flat and which is formed with perforations, of a plurality of scales having scale pans provided with prongs extending through said perforations, and means for tilting said scales so as to depress said prongs below the upper surface of said support.

10. In apparatus of the character described, the combination with a rotary support for receptacles, formed with perforations, of a plurality of scales provided with prongs extending through said perforations, and means for tilting said scales so as to depress said prongs, comprising a circular cam track.

11. In apparatus of the character described, the combination with a rotary support for receptacles, formed with perforations, of a plurality of scales provided with prongs extending through said perforations, means for tilting said scales so as to depress said prongs, comprising a circular cam track, and means for feeding the receptacles upon said support and discharging them therefrom while said prongs are depressed.

12. In apparatus of the character described, the combination with a stationary table, of a rotary support in the same plane therewith, formed with perforations, a plurality of scales provided with prongs adapted to extend through said perforations, a device for each of said scales adapted to engage therewith and tilt the same so as to depress said prongs, a circular cam track to operate said devices, and means for feeding receptacles from the table to said support and discharging the same from the support to the table while said prongs are depressed.

13. In apparatus of the character described, the combination with a movable support, of a scale on said support comprising a beam, a weight slidable on said beam, mechanism for moving said weight to a counterbalancing position on the beam, and means whereby said mechanism is actuated upon the movement of the support.

14. In apparatus of the character described, the combination with a scale comprising a beam, of a weight slidable on said beam, a device which engages said weight and moves the same to a counterbalancing position on the beam, said weight being disengaged from said engaging means by the tilting of the beam when the weight reaches said counterbalancing position, and mechanism whereby the movement of said device is effected.

15. In apparatus of the character described, the combination with a scale comprising a beam, of a weight slidable on said beam, a device which engages with and moves said weight to a counterbalancing position, said weight being disengaged from said engaging means by the tilting of the beam when the weight reaches said counterbalancing position, and means for giving reciprocating movements to said device.

16. In apparatus of the character described, the combination with a scale comprising a beam, of a weight slidable on said beam, a device adapted to engage with said weight on opposite sides thereof and move the weight alternately in opposite directions; said weight being disengaged from said reciprocating device by a tilting of the beam when the weight is in its counterbalancing position, and means for giving reciprocating movements to said device.

17. In apparatus of the character described, the combination with a movable support, of a scale on said support comprising a beam, a weight slidable on said beam, mechanism for moving said weight in opposite directions on said beam, and means whereby said mechanism is actuated upon the movement of said support.

18. In apparatus of the character described, the combination with a rotatable support, of a scale on said support comprising a beam, a weight slidable on said beam, a stationary cam and means actuated by said cam upon the movement of the support for moving said weight to a counterbalancing position.

19. In apparatus of the character described, the combination with a rotatable support, of a scale on said support comprising a beam, a weight slidable on said beam, a pair of stationary cams and means actuated by said cams upon the movement of the support for moving the weight to a counterbalancing position, and thereafter returning it to its initial position.

20. In apparatus of the character described, the combination with a scale comprising a beam, of a weight slidable on said beam, a member adapted to engage the weight on one side and move it outwardly on the beam and thereafter on the other side, and move it inwardly, means for giving reciprocating movements to said member and means for tilting said beam so as to free the weight from said reciprocating device when it has reached its initial position on the return movement.

21. In apparatus of the character described, the combination with a rotatable support, of a plurality of scales mounted on said support, each comprising a scale beam and a weight movable thereon, a reciprocating device for each of said scales adapted to move the weight back and forth on the scale beam, a pair of stationary cams which actuate said reciprocating device, lifting devices adapted to tilt said scales when the weights have been returned to their initial positions on the beams, and a circular cam track for actuating said lifting devices.

22. In apparatus of the character described, a scale comprising a pair of scale pans, a beam to support the same having forked ends, blocks secured to the under sides of said scale pans provided with pairs of knife edges spaced apart which bear upon the forked ends of the beam, a weight beam, and rods pivoted to the weight beam and extending through the forks on the scale pan beam and connected with said scale pans.

23. In apparatus of the character described, the combination with a movable support, a scale on said support, a weight and means actuated by the movement of said support for lifting the weight out of and bringing the same into operative relationship with said scale.

24. In apparatus of the character described, the combination with a rotatable supporting means, of a scale on said supporting means, a weight, a weight support on which the weight is loosely sustained, and a cam adapted to raise and lower said support.

25. In apparatus of the character described, the combination with rotatable supporting means, of a scale on said supporting means, a vertically movable support having a horizontal arm, a slotted weight supported on said arm, and a cam for raising and lowering said support.

26. In a machine of the character described, the combination with a reservoir provided with a discharge valve for supplying material to a receptacle, of a tiltable scale on which said receptacle is adapted to be sustained, a member connected with said valve for opening and closing the same, means for moving said member in one direction to open the valve, a fluid pressure mechanism for moving said member in the opposite direction to close the valve, comprising containing means adapted to receive a motive fluid, and a movable member against which said motive fluid operates, and means carried by said scale for controlling the actuation of said fluid pressure actuated movable member.

27. In a machine of the character described, the combination with weighing mechanism adapted to sustain a receptacle, of filling apparatus having a port adapted to discharge into said receptacle, a device for closing said port, fluid pressure mechanism for moving said device to its closing position, comprising containing means adapted to receive a motive fluid, and a movable member against which said motive fluid operates, and means actuated by said weighing mechanism for setting said fluid pressure operated movable member in operation.

28. In a machine of the character described, the combination with weighing mechanism adapted to sustain a receptacle, of filling apparatus having a port adapted to discharge into said receptacle, a valve to control said port, a cylinder having an exhaust connection which is a part of the time ineffective, a piston in said cylinder connected with said valve, and means actuated by said weighing mechanism for making said exhaust connection to the cylinder effective so that the air is exhausted from the cylinder to shift said piston and valve.

29. In a machine of the character described, the combination with weighing mechanism adapted to sustain a receptacle, of filling apparatus having a port adapted to discharge into said receptacle, a valve to control said port, a cylinder having an exhaust connection which is a part of the time ineffective, a piston in said cylinder connected with said valve, means actuated by said weighing mechanism for making said exhaust connection to the cylinder effective so that the air is exhausted from the cylinder to shift said piston and valve, and means for moving said valve to its open position.

30. In a machine of the character described, the combination with weighing mechanism adapted to sustain a receptacle, of filling apparatus having a port adapted to discharge into said receptacle, a valve to control said port, a cylinder adapted to be connected with an exhausting apparatus, and having a port leading to the atmosphere, a piston in said cylinder connected with said valve, a valve to close the port in the cylinder, and means actuated by said weighing mechanism for moving said last named valve.

31. In a machine of the character described, the combination with a rotary support; of filling apparatus having a discharge port; a valve to control said port; a fluid pressure actuated mechanism to move said valve, a vacuum chamber in which said fluid pressure acts; a ring on said support having a port in communication with said vacuum chamber; a stationary ring engaging the first mentioned ring having a port provided with an exhaust connection a part of the time ineffective, with which port the port in the rotating ring communicates; weighing mechanism; and means actuated by said weighing mechanism for making the exhaust connection to said vacuum chamber effective.

32. In a machine of the character described, the combination with a rotary support; of filling apparatus having a discharge port; a valve to control said port; a fluid pressure actuated mechanism to move said valve comprising a piston connected with said valve; a cylinder for said piston having a port leading to the atmosphere; a ring on said support having a port communicating with said cylinder; a stationary ring engaging the first mentioned ring having a port provided with an exhaust connection with which port the port in the rotating ring communicates; weighing mechanism; and means actuated thereby for closing the atmosphere port of the cylinder.

33. In a machine of the character described, the combination with a rotary support; of filling apparatus having a discharge port; a valve to control said port; a fluid pressure actuated mechanism to move said valve to its closed position comprising a piston connected with said valve; a cylinder for said piston having a port leading to the atmosphere; a ring on said support having a port communicating with said cylinder; a stationary ring engaging the first mentioned ring having a port provided with an exhaust connection, with which port the port in the rotating ring communicates; weighing mechanism; means actuated thereby for closing the atmosphere port of the cylinder; and means for moving the valve to its open position.

34. In a machine of the character described, the combination with a rotary support; of filling apparatus having a discharge port; a valve to control said port; a fluid pressure actuated mechanism to move said valve to its closed position comprising a piston connected with said valve; a cylinder for said piston having a port leading to the atmosphere; a ring on said support having a port communicating with said cylinder; a stationary ring engaging the first mentioned ring having a port provided with an exhaust connection, with which port the port in the rotating ring communicates; weighing mechanism; means actuated thereby for closing the atmosphere port of the cylinder; and means for moving the valve to its open position comprising a rocking member carried on said valve and a stationary member with which it engages.

35. In a machine of the character described, the combination with weighing mechanism adapted to support a receptacle to be filled, of a tank adapted to contain a liquid, a measuring vessel having a port below the level of the liquid in the tank through which liquid from the tank may flow up into said measuring vessel, means providing a discharge port from the vessel to said receptacle, means for alternately opening and closing communication between the tank and measuring vessel and the measuring vessel and said receptacle through the aforementioned ports, means providing a dribble port from the tank to said receptacle, and mechanism operated by the weighing mechanism for closing said dribble port.

36. In a machine of the character described, the combination with a moving support, of a weighing mechanism on said support comprising weights to counterpoise an empty receptacle and its charge respectively, mechanism operated by the movement of said support for moving the receptacle weight into position to counterpoise the empty receptacle.

37. In a machine of the character described, the combination with a continuously moving driven element, of a weighing mechanism comprising weights to counterpoise an empty receptacle and a charge respectively, and mechanism operated upon the operation of said driven element for successively bringing said weights into position to counterpoise the receptacle and the charge.

38. In a machine of the character described, the combination with a driven element, of a weighing mechanism comprising a scale beam, a weight thereon, mechanism operated by said driven element for moving the weight on the beam so as to counterpoise an empty receptacle, a weight to counterpoise the charge in the receptacle, and means actuated by the movement of said driven element for bringing said last mentioned weight into operative relationship with the weighing mechanism.

39. In a machine of the character described, the combination with a driven element of a weighing mechanism comprising a scale beam, a weight thereon, mechanism operated by said driven element for moving the weight on the beam so as to counterpoise an empty receptacle and for returning the weight to its original position, a weight to counterpoise the charge in the receptacle, and means actuated by the movement of said driven element for bringing said last mentioned weight into operative relationship with the weighing mechanism.

40. In a machine of the character described, a weighing mechanism comprising a pair of scale pans, one of the same being adapted to sustain a receptacle, a beam supporting said scale pans, means for counterpoising the empty receptacle, a weight to be counterpoised by the charge, and means for placing the same upon and removing the same from the other of said scale pans.

41. In a machine of the character described, the combination with a support for a receptacle, of a weighing mechanism comprising a pair of scale pans, one of which is adapted to lift the receptacle from said support, a beam sustaining said scale pans, means for counterpoising the receptacle when empty, a weight to be counterpoised by the charge, and means for placing the same upon and removing the same from the other of said scale pans.

42. In a machine of the character described, a weighing mechanism comprising a pair of scale pans, one of the same being adapted to sustain a receptacle, a beam supporting said scale pans, means for counterpoising the empty receptacle, a weight to be counterpoised by the charge, means for placing the same upon and removing the same from the other of said scale pans, and means for sliding the receptacle upon and removing the same from said support.

43. In a machine of the character described, the combination with a perforated support for a receptacle, of weighing mechanism comprising a scale pan having prongs adapted to extend through said support, means for depressing the prongs so as to permit the receptacle to be moved over the support, a weight, and means for bringing said weight into and out of operative relationship with the weighing mechanism.

44. In a machine of the character described, the combination with a perforated support for a receptacle, of weighing mechanism comprising a scale pan having prongs adapted to extend through said support, means for depressing the prongs so as to permit the receptacle to be moved over the support, a weight adapted to be moved so as to be counterpoised by the charge and adapted to be brought into and out of operative relationship with said weighing mechanism, and means for returning said weights to their inoperative positions.

45. In a machine of the character described, the combination with a movable support, of filling apparatus on said support having a discharge port, weighing mechanism comprising weights to counterpoise an empty receptacle and its charge respectively, mechanism operated by the movement of said support for successively bringing said weights into position to counterpoise the receptacle and charge, and means actuated by the balancing of said weighing mechanism for closing said discharge port.

46. In a machine of the character described, the combination with a driven element, of filling apparatus having a discharge port, weighing mechanism comprising weights to counterpoise an empty receptacle and a charge, respectively, mechanism operated when said driven element is moved for successively bringing said weights into position to counterpoise the receptacle and charge, and means actuated by the balancing of said weighing mechanism for closing said discharge port.

47. In a machine of the character described, the combination with a driven element of weighing mechanism and filling apparatus carried on said driven element, said filling apparatus comprising means for introducing a definite quantity by volume into a receptacle, means constituting a dribble port, and means actuated by the weighing mechanism for closing said dribble port.

48. In a machine of the character described, the combination with weighing mechanism comprising automatically operating means for first counterpoising an empty receptacle and thereafter weighing the charge; of a filling apparatus comprising means for introducing a definite quantity by volume of the material into the receptacle to be filled, means constituting a dribble port, and means actuated by the balancing of the weighing mechanism for closing the dribble port.

49. In a machine of the character described, the combination with weighing mechanism comprising a weight and means for moving the same to counterpoise a receptacle when empty, a weight, means for bringing the same into operative relationship with the weighing mechanism so as to be counterpoised by the charge; of filling apparatus comprising means for introducing a definite quantity by volume into the receptacle, means constituting a dribble port, and means actuated by the balancing of the weighing mechanism by the charge for closing said dribble port.

50. In a machine of the character described, the combination with a tank, of a measuring vessel adapted to be alternately filled from the tank and to discharge into a receptacle, means constituting a dribble port for conducting liquid from the tank to the receptacle, and weighing mechanism comprising automatically operating means for counterpoising the empty vessel, automatically operating means for weighing the charge, and means actuated by the balancing of the weighing mechanism under the charge for closing the dribble port.

51. In a machine of the character described, the combination with a driven element of a scale carried by said driven element, a weight to counterpoise the charge, means supported on said driven element and operated by the movement thereof for introducing a definite volume of liquid into a receptacle, means for introducing a stream of liquid into said receptacle, and means actuated by the balancing of the scale under the charge for shutting off said stream of liquid.

52. In a machine of the character described, the combination with a support for a receptacle, of a scale comprising a scale pan provided with means adapted to lift said receptacle from said support and to replace the same thereon, a weight to be counterpoised by the charge, means for introducing a definite volume of liquid into said receptacle, means for introducing liquid in a stream into said receptacle, and means actuated by the balancing of the scale under the charge for shutting off said stream of liquid.

53. In a machine of the character described, the combination with a support for a receptacle, of a scale comprising means adapted to lift said receptacle from said support and to replace the same thereon, a weight to be counterpoised by the charge, means for introducing a definite volume of liquid into said receptacle, means for introducing liquid in a stream into said receptacle, means actuated by the balancing of the scale under the charge for shutting off said stream of liquid, and means for bringing said weight into and out of operative relationship with the scale.

54. In a machine of the character described, the combination with a scale, of a weight adapted to be moved so as to counterpoise a receptacle when empty, a weight adapted to be counterpoised by the charge, means for bringing said last mentioned weight into and out of operative relationship with said scale, means for introducing a definite volume of liquid into the receptacle, means for introducing liquid in a stream into said receptacle, and means actuated by the balancing of the scale under the charge for shutting off said stream of liquid.

55. In a machine of the character described, the combination with rotating supporting means, of a supply tank, a plurality of weighing mechanisms, a plurality of rotary measuring vessels adapted to be filled from said tank and to discharge into receptacles to be filled, means constituting dribble ports adapted to conduct liquid to said receptacles, and means operated by the balancing of said several weighing mechanisms for closing said dribble ports.

56. In a machine of the character described, the combination with rotating supporting means, of a supply tank, a plurality of weighing mechanisms comprising weights adapted to be moved so as to counterpoise the empty cans, and weights adapted to be brought into operative relationship with the weighing mechanism so as to be counterpoised by the charge, a plurality of rotary measuring vessels adapted to be filled from the tank and to discharge into receptacles, means constituting dribble ports adapted to conduct liquid to said receptacles, and means operated by the balancing of the several weighing mechanisms for closing said dribble ports.

57. In a machine of the character described, the combination with rotary supporting means, of a plurality of perforated receptacle supports circumferentially arranged thereon, scales provided with prongs adapted to extend through the perforations in said receptacle supports, means for depressing said prongs, weights to counterpoise the empty receptacles, reciprocating devices adapted to engage said weights and move them into counterpoising position and back to their initial positions, weights adapted to be counterpoised by the charges, supports for said weights adapted to bring them into and out of operative relationship with said scale, a supply tank, rotary measuring vessels adapted to be filled from said supply tank and to discharge into the receptacles, means for rotating said vessels, means constituting dribble ports, valves controlling said ports, means for moving said valves to open said dribble ports, and mechanisms actuated by the balancing of said scales for moving said valves to close said dribble ports.

58. In apparatus of the character described, the combination with a support for a receptacle having a flat surface over which the receptacle may be slid and formed with perforations, of a scale provided with prongs adapted to project through said perforations so as to lift the receptacle from the support and sustain it during the weighing operation, and means for automatically depressing said prongs so that they do not interfere with the movement of the receptacle across said support.

59. In apparatus of the character described, the combination with a support for a receptacle having a flat surface over which the receptacle may be slid, of a scale provided with means adapted to project through said support and lift the receptacle therefrom and sustain it during the weighing operation, means for automatically depressing said projecting means so that it does not interfere with the movement of the receptacle across the support, and means for sliding said receptacle across said support while said engaging means are depressed.

60. In apparatus of the character described, the combination with a driven element, of a scale, a weight, a support on which said weight is loosely sustained, and mechanism actuated by said driven element for raising and lowering said support so as to move the weight into and out of operative relation with the scale.

61. In a machine of the character described, the combination with a movable support, of weighing mechanism thereon adapted to sustain a receptacle, filling apparatus having a port adapted to discharge into said receptacle, a valve to control said port, mechanism for moving said valve to open the port, means operated when said support is moved for actuating said last named mechanism, and means actuated by the weighing mechanism for moving the valve to close said port.

62. In a machine of the character described, the combination with a rotatable support, of weighing mechanism thereon adapted to sustain a receptacle, filling apparatus having a port adapted to discharge into said receptacle, a valve to control said port provided with a projecting member, a device standing in the path of said projecting member with which said member engages so as to move the valve to its open position, and means actuated by said weighing mechanism for closing said port.

63. In a machine of the character described, the combination with a rotatable support, of weighing mechanism thereon adapted to sustain a receptacle, filling apparatus having a port adapted to discharge into said receptacle, a valve to control said port provided with a projecting member, a device standing in the path of said projecting member with which said member engages so as to move the valve to its open position, and means actuated by said weighing mechanism for closing said port, said device being movably mounted so that it may be moved out of the path of said projecting member.

64. In a machine of the character described, the combination with a driven element, of a weighing mechanism comprising a scale beam, a weight thereon, mechanism operated by said driven element for moving the weight on the beam so as to counterpoise an empty receptacle, a weight to counterpoise the charge, mechanism for moving said last mentioned weight into and out of operative relationship with the weighing mechanism and means operated when said driven element is moved for actuating said last named mechanism.

65. In a machine of the character described, the combination with a continuously driven element, of a weighing mechanism comprising weights to counterpoise an empty receptacle and its charge respectively, and mechanism actuated by the movement of said driven element for moving the receptacle weight into position to counterpoise the empty receptacle and for returning the same to its initial position.

66. In a machine of the character described, the combination with a driven element, of a weighing mechanism comprising weights to counterpoise an empty receptacle and its charge respectively, and mechanism actuated by the movement of said driven element for successively bringing said weights into operative relationship with the weighing mechanism and returning the same to inoperative position with respect thereto.

67. In a machine of the character described, the combination with a driven element, of filling apparatus, a weighing mechanism set in operation by said driven element for first counterpoising an empty receptacle and then weighing the charge received therein, mechanism for stopping the operation of the filling apparatus and means operated by said weighing mechanism for actuating said last named mechanism.

68. In a machine of the character described, the combination with a driven element, of filling apparatus set in operation thereby, a weighing mechanism set in operation by said driven element for counterpoising an empty receptacle and weighing the charge received therein, and mechanism actuated by the aforementioned mechanism for stopping the operation of the filling apparatus.

69. In a machine of the character described, the combination with a driven element, of filling apparatus, a weighing mechanism set in operation by said driven element for counterpoising an empty receptacle and weighing the charge received therein, mechanism actuated by the aforementioned mechanism for stopping the operation of the filling apparatus, and means operated by said driven element for introducing the receptacles into their filling positions and removing the same therefrom.

70. In a machine of the character described, the combination with a driven element, of filling apparatus, a weighing mechanism set in operation by said driven element for counterpoising an empty receptacle and weighing the charge received therein, mechanism actuated by the aforementioned mechanism for stopping the operation of the filling apparatus, and hand operated means for stopping the operation of the filling apparatus without stopping the movement of the driven element.

71. In a machine of the character described, the combination with a driven element, of filling apparatus, a scale having a beam and a weight pan, a weight on the beam to counterpoise an empty receptacle, a weight to counterpoise the charge adapted to be held out of contact with the weight pan, mechanism operated by said driven element for moving said weights successively into and out of counterpoising positions, and mechanism actuated by said scale for stopping the operation of the filling apparatus.

72. In a machine of the character described, the combination with a driven element, of volume filling apparatus operated thereby, a supply tank having a dribble port, weighing mechanism actuated by the driven element for counterpoising an empty receptacle and measuring its charge, and mechanism actuated by said last mentioned mechanism for closing said dribble port.

73. In a machine of the character described, the combination with a movable support, of means for feeding receptacles upon and discharging them from said support, a supply tank, and a plurality of filling and weighing units carried on said support each comprising a weighing mechanism, a filling apparatus and means actuated by the weighing mechanism for putting said filling apparatus out of operation.

74. In a machine of the character described, the combination with a movable support, of a supply tank and a plurality of filling and weighing units carried on said support, each comprising a weighing mechanism for counterpoising an empty receptacle and measuring the charge received therein, a filling apparatus, and means actuated by the weighing mechanism for putting said filling apparatus out of operation.

75. In a machine of the character described, the combination with weighing mechanism adapted to support a receptacle to be filled, of a tank adapted to contain a liquid, a measuring vessel immersed in the liquid in the tank and having a port below the level of said liquid through which liquid from the tank may flow into said measuring vessel, means providing a discharge port from the vessel to said receptacle, means for alternately opening and closing communication between the tank and measuring vessel and the measuring vessel and said receptacle through the aforementioned ports, means providing a dribble port from the tank to said receptacle, and mechanism operated by the weighing mechanism for closing said dribble port.

76. In a machine of the character described, the combination with weighing mechanism adapted to support a receptacle to be filled, of a tank adapted to contain a liquid, a rotatable measuring vessel immersed in the liquid in the tank having a port below the level of said liquid through which liquid from the tank may flow into said measuring vessel, means providing a discharge port from the vessel to said receptacle, means for rotating said measuring vessel so as to alternately open and close communication between the tank and the vessel and the vessel and said receptacle through said ports, means providing a dribble port from the tank to the receptacle, and mechanism operated by said weighing mechanism for closing the dribble port.

77. In a machine of the character described, the combination with a rotatable support, of weighing mechanism adapted to receive a receptacle to be filled, a tank adapted to contain a liquid, a measuring vessel immersed in the liquid in said tank having an inlet port below the level of said liquid and an outlet port adapted to discharge into said receptacle, means actuated by the movement of said support for opening and closing said ports in alternation, means constituting a dribble port from the tank to said receptacle, mechanism operated by the movement of said support for opening the dribble port, and mechanism operated by the weighing mechanism for closing the same.

78. In a machine of the class specified, the combination with a receptacle carrier, of a reservoir provided with a discharge valve for supplying material to a receptacle on said carrier; of a tiltable scale for weighing the empty and filled receptacle; a member connected with said valve for opening and closing the latter; means for moving said member in one direction to open said valve; fluid pressure mechanism for moving said member in the opposite direction to close the valve; comprising containing means adapted to receive a motive fluid and a movable element against which said motive fluid operates and a cut-off valve carried by said scale for controlling the actuation of said fluid pressure actuated movable member.

79. In a machine of the character described, the combination with a driven element, of a weighing mechanism comprising weights to counterpoise an empty receptacle and its charge respectively, and mechanism, one for each weight, operated upon the operation of said driven element for successively bringing said weights into position to counterpoise the receptacle and the charge.

FREDRICK LESTER JEFFERIES.
WILLIAM SPAIN.

Witnesses:
F. M. SAYRE,
A. H. KELLING.

Copies of this patent may be obtained for five cents each, by addressing the "Commissioner of Patents, Washington, D. C."